United States Patent [19]

Miller

[11] Patent Number: 4,808,048
[45] Date of Patent: Feb. 28, 1989

[54] METHOD AND APPARATUS FOR ERROR COMPENSATION

[75] Inventor: Walter Miller, Traunstein, Fed. Rep. of Germany

[73] Assignee: Johannes Heidenhain GmbH, Traunreut, Fed. Rep. of Germany

[21] Appl. No.: 100,019

[22] Filed: Sep. 23, 1987

[30] Foreign Application Priority Data

Oct. 2, 1986 [DE] Fed. Rep. of Germany ....... 3633573

[51] Int. Cl.⁴ .............................................. B23B 39/08
[52] U.S. Cl. ..................................... 409/239; 408/13
[58] Field of Search ................ 409/238, 239, 134–136, 409/204, 207, 218; 408/13

[56] References Cited

U.S. PATENT DOCUMENTS

| | | | |
|---|---|---|---|
| 3,045,510 | 7/1962 | Brainard | 409/239 |
| 3,602,090 | 8/1971 | Whetham | 409/239 |
| 3,735,157 | 5/1973 | Whetham | 409/239 |
| 4,100,837 | 7/1978 | Kohler | 409/238 |
| 4,354,404 | 10/1982 | Ramusino | 408/13 |
| 4,440,530 | 4/1984 | Yamakage | 408/13 |
| 4,581,808 | 4/1986 | Lawson et al. | 408/13 |
| 4,728,232 | 3/1988 | Babel | 409/135 |

FOREIGN PATENT DOCUMENTS

| | | |
|---|---|---|
| 0061087 | 9/1982 | European Pat. Off. . |
| 2450322 | 5/1976 | Fed. Rep. of Germany . |
| 3026734 | 5/1981 | Fed. Rep. of Germany . |
| 8107419 | 11/1981 | Fed. Rep. of Germany . |
| 3109903 | 9/1982 | Fed. Rep. of Germany . |
| 3320529 | 12/1984 | Fed. Rep. of Germany . |

Primary Examiner—John McQuade
Attorney, Agent, or Firm—Toren, McGeady & Associates

[57] ABSTRACT

A method and apparatus for compensating displacements of a machine point due to temperature changes, such as the temperature-related displacement of a work spindle axis of a milling machine relative to a machine reference point. The measurement values of the intended positioning of the work spindle axis are determined by means of a position measuring device which includes at least one first sensing device for sensing a measuring scale. A second sensing device connected to a housing of the work spindle through a push rod of a material having a small coefficient of expansion is used to directly determine the temperature-related displacement with respect to direction and magnitude. The determined value is computed into the measurement value of the intended position by means of an analyzing unit. The result is a compensation of the temperature-related displacement of the work spindle axis.

11 Claims, 1 Drawing Sheet

METHOD AND APPARATUS FOR ERROR COMPENSATION

BACKGROUND OF THE INVENTION

1. Field of the Invention

The present invention relates to method for compensating displacements of a machine point due to temperature changes. The invention relates particularly to a method for compensating displacements due to temperature changes of a work spindle axis relative to a machine reference point. The measurement values for the intended positioning of the work spindle axis are determined by means of a position measuring device which includes at least one sensing device for sensing a measuring scale.

2. Description of the Prior Art

In newer types of machine tools, intended displacements in the directions of the individual axes are determined by means of position measuring devices or measurement systems and the measured values are digitally indicated by means of position indicators. The measured values determined by the position measuring devices can also be supplied to NC-controls for further processing.

Even though the determination of the positions on the individual axes in, for example, a universal tool and milling machine, can for structural reasons not be carried out directly at the location of the respective axis, the precision of the determination of the position is not negatively influenced as long as the operating temperature does not change non-uniformly.

A high rate of rotation of the work spindle during operation causes a rise in the operating temperature of the spindle bearing and of the vertical milling head in the vicinity of the axes relative to the spindle carriage of the milling head. However, the position measuring device for measuring the intended displacement of the spindle carriage and, thus, of the work spindle axis, is mounted on the spindle carriage.

Accordingly, due to the rise in temperature, the work spindle axis is displaced. This displacement is not detected by the position measuring device.

Various proposals have been made in the art for compensating these displacements due to temperature changes.

For example, German Pat. No. 2,450,322 discloses a solution in which a so-called expansion rod is utilized. Such expansion rods contact the measuring scales of the position measuring device. If such expansion rods are used, it is necessary to take into consideration the coefficients of expansion of the various materials used. In addition, the given machine geometry must be taken into consideration. While such systems in which expansion rod compensations are carried out are simple in structure, they have the disadvantage that they react relatively sluggishly to temperature changes.

Another solution is disclosed in German Offenlegungsschrift No. 3,320,529. A scale of the position measuring device is movably mounted on the spindle carriage and a push rod of a material having a small coefficient of expansion causes a displacement of the scale in accordance with the temperature change. Compared to the solution utilizing the expansion rod, the solution according to German Offenlegungsschrift No. 3,320,529 has the advantage that displacement of the work spindle axis due to temperature changes are taken into consideration with hardly any delay. However, this solution does not have the disadvantage that very exact guide means must be provided for the displacement of the scale.

It is, therefore, the primary object of the present invention to provide a simple means for compensating the displacement of a machine point due to temperature changes. In addition, position measuring devices are to be used for this purpose which are in general production or at least essentially in general production.

It is another object of the present invention to provide an apparatus for carrying out the above described method.

SUMMARY OF THE INVENTION

In accordance with the present invention, the displacement of a work spindle axis due to temperature changes is determined with respect to direction and magnitude directly at the measuring scales of the position measuring device by means of a second sensing device of the same type as the sensing device mentioned above, and the measured displacement values are computed into the measurement values for the intended positioning of the work spindle.

In an apparatus for carrying out the above-described method, the second sensing device is mounted on the side of the position measuring device facing the work spindle axis. The second sensing device is connected to a housing of the work spindle through a push rod of a material having a sufficiently small coefficient of expansion.

The compensation of displacements caused by temperature changes in accordance with the present invention has the particular advantage that instantaneous displacements are detected directly by a measuring device and can be computed in a very simple manner into the measured values for the intended positioning. Correction factors of any selected type may be taken into consideration. The structural equipment used may essentially be that of measurement systems in general productions. Special guide elements are not required.

The various features of novelty which characterize the invention are pointed out with particularity in the claims annexed to and forming a part of this disclosure. For a better understanding of the invention, its operating advantages and specific objects attained by its use, reference should be had to the drawings and descriptive matter in which there is illustrated and described a preferred embodiment of the invention.

DETAILED DESCRIPTION OF THE INVENTION

Figure 1:
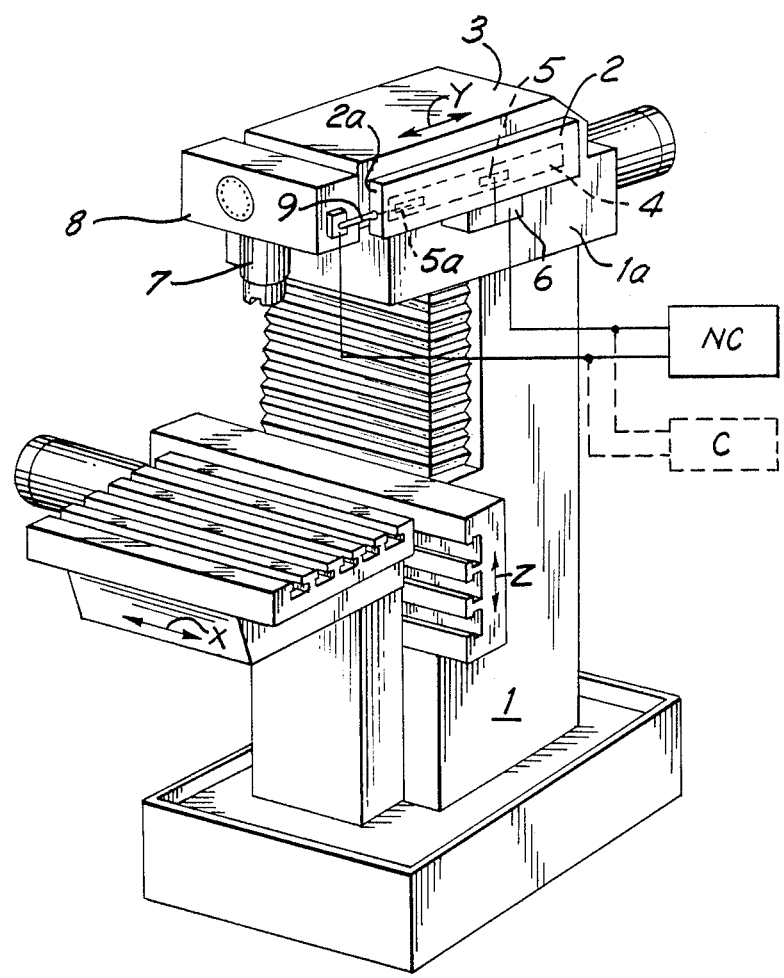
FIG. 1 is a perspective view of a universal tool and milling machine.

A universal tool and milling machine 1 illustrated in FIG. 1 includes a numerical control NC for controlling the milling machine 1. Each of the three axes X, Y, Z of the milling machine 1 has a position measuring device. In the drawing, only the position measuring device 2 for the Y-axis is shown.

The position measuring device 2 is mounted on a spindle carriage 3 and carries measuring scale 4. When the spindle carriage 3 is displaced relative to a support 1a, the measuring scale 4 is sensed in the known manner by a sensing device 5 which is mounted stationary on support 1a by means of an assembly base 6. The spindle carriage 3 has at an end face thereof a work spindle 7 which is supported in a housing 8 which is connected to spindle carriage 3.

Position measuring device 2 measures intended displacements, i.e., displacements provided manually or through a NC-program, of the work spindle 7. For working on a workpiece, the workpiece is mounted in a chucking device in the work spindle 7. However, the workpiece is not illustrated in the drawing.

Due to the relatively high rate of rotation of the work spindle 7 during the working of a workpiece, heat is generated in the bearing of the work spindle 7 which also causes the housing 8 of the work spindle 7 to be heated. Additional sources of heat are, for example, bearings of gear shafts.

The heat generated in the above-described manner causes the spindle carriage 3 and its housing 8 to expand which, in turn, causes temperature-related displacements of the work spindle 7. The position measuring device 2 which is intended to measure the position of the spindle carriage 3 and, thus, the position of the work spindle 7, is unable to detect these temperature-related displacements. This results in measurement errors which are due to the fact the position measuring device 2 registers a position of work spindle 7 which does not correspond to the actual position of the work spindle 7.

In accordance with the present invention, an additional sensing device 5a is provided in the precision measuring device 2 on an end face 2a which faces work spindle 7. Contrary to the normal sensing device 5, the additional sensing device 5a is not mounted on support 1a of the milling machine 1, but is connected to the housing 8 in the plane of the work spindle axis 7a. The connection of the sensing device 5a with the housing 8 is effected through a push rod 9 of a material which has a sufficiently small coefficient of expansion. Suitable materials are INVAR, VACODIL or similar materials.

When the work spindle axis 7a is displaced due to a change in temperature, the sensing device 5a is moved along the measuring scale 4 by a distance which corresponds to the displacement. The sensing device 5a senses the measuring scale 4 in the same manner as the normal sensing device 5. Accordingly, as the temperature-related displacement of spindle 7 occurs, the displacement is immediately determined with respect to direction and magnitude. The measurement value of the displacement is supplied to an analyzing unit C, NC and is computed in this unit into the measurement value of the intended position. For this purpose, the normal sensing device 5 and the additional sensing device 5a are connected to a numerical control NC for an electronic counter C.

Thus, the analyzing unit C, NC is capable of compensating the temperature-related displacement of work spindle axis 7a. In addition, it is easily possible to take into account other correction factors of any type.

The apparatus required for such a compensation according to the present invention is very simple because modern analyzing units already include microprocessors and the computation of the respective measurement values poses no problems.

The additional sensing device 5a can be virtually identical to the normal sensing device 5. In addition, the additional sensing device 5a is guided in the position measuring device 2 in the same manner as the normal sensing device 5.

Figure 2:
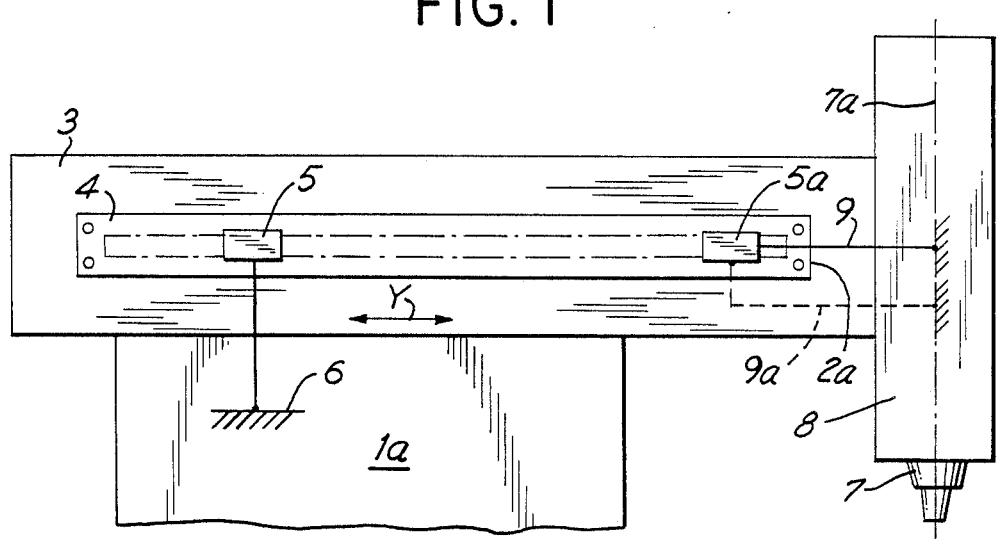
FIG. 2 is a schematic illustration of a work spindle head of the machine illustrated in FIG. 1.

The mechanical coupling by means of the push rod 9 can be effected by a connection of the sensing device 5a at the end face thereof with a fixed point on housing 8 which is located in the same plane as the work spindle axis 7a. This coupling of the sensing device 5a is illustrated in FIG. 2 in solid lines. This type of coupling prevents tilting errors because the push rod 9 is located in the direct extension of the scale of the measuring scale 4 in accordance with Abbe's comparator principle.

However, if the sensing devices 5 and 5a are to be completely identical, a coupling by means of push rod 9a is also possible. In FIG. 2, this push rod 9a is illustrated in broken lines. Since, in this case, the above-mentioned tilting errors can occur, an appropriate correcting value is taken into consideration during the compensation.

While a specific embodiment of the invention has been shown and described in detail to illustrate the application of the inventive principles, it will be understood that the invention may be embodied otherwise without departing from such principles.

I claim:

1. In a method for compensating displacements of a machine point due to temperature changes relative to a machine reference point, the machine having a first stationary machine component and a second machine component movable relative to the first machine component, the reference point being on the first machine component and the machine point being at the second machine component, including determining the measurement values for the intended positioning of the machine point by means of a position measuring device which includes at least a first sensing device attached to the first machine component for sensing a measuring scale attached to the second machine component, the improvement comprising determining the temperature-related displacement with respect to direction and magnitude directly at the measuring scale of the position measuring device by means of a second sensing device of the same type as the first sensing device, the second sensing device being mounted at the machine point, and computing the determined displacement value into the measurement values for the intended positioning of the machine point.

2. The method according to claim 1, wherein the sensing devices are connected to an analyzing unit.

3. The method according to claim 2, wherein the analyzing unit is an electronic counter.

4. The method according to claim 2, wherein the analyzing unit is a NC-control.

5. An apparatus for compensating the displacement of a machine point due to temperature changes relative to a machine reference point, the machine having a first stationary machine component and a second machine component movable relative to the first machine component, the reference point being on the first machine component and the machine point being at the second machine component, comprising a position measuring device for determining the measurement values for the intended positioning of the machine point, the position measuring device including at least a first sensing device attached to the first machine component for sensing a measuring scale attached to the second machine component, the position measuring device having at a side thereof facing the machine point an additional sensing device for sensing the measuring scale, the additional sensing device being of the same type as the first sensing device, and a push rod of a material having a sufficiently small coefficient of expansion connecting the second sensing device with the second machine component at the machine point, so that the second sensing device is capable of determining the displacement of the machine point with respect to direction and magnitude on the measuring scale of the position measuring device.

6. The apparatus according to claim 5, wherein the material of the push rod is INVAR or VACODIL.

7. The apparatus according to claim 5, wherein the sensing devices are connected to an analyzing unit.

8. The apparatus according to claim 7, wherein the analyzing unit is an electronic counter.

9. The apparatus according to claim 7, wherein the analyzing unit is a NC-control.

10. The method according to claim 1, wherein the second machine component is a spindle carriage, a work spindle attached to the spindle carriage, the machine point being the work spindle axis.

11. The apparatus according to claim 5, wherein the second machine component is a spindle carriage, a work spindle attached to the spindle carriage, the machine point being the work spindle axis.

* * * * *